(12) United States Patent
Rastogi et al.

(10) Patent No.: US 11,134,760 B2
(45) Date of Patent: Oct. 5, 2021

(54) SYSTEM AND METHOD FOR MANUFACTURING HOLLOW TUBULAR JEWELLERY

(71) Applicant: Titan Company Limited, Bangalore (IN)

(72) Inventors: Abhishek Rastogi, Bangalore (IN); Pooja Kabra, Bangalore (IN); Saloni Kaushik, Bangalore (IN); Karthikeyan K, Bangalore (IN); Madhavan R, Bangalore (IN); Sasikumar P, Bangalore (IN); Suresh Babu R, Bangalore (IN); Naresh S, Bangalore (IN); Sakthivel K, Bangalore (IN); Ganesh Kumaran R, Bangalore (IN); Muruganandam K, Bangalore (IN); Sudhagar A, Bangalore (IN); Srikanth N, Bangalore (IN)

(73) Assignee: Titan Company Limited, Bangalore (IN)

( * ) Notice: Subject to any disclaimer, the term of this patent is extended or adjusted under 35 U.S.C. 154(b) by 0 days.

(21) Appl. No.: 16/892,838

(22) Filed: Jun. 4, 2020

(65) Prior Publication Data

US 2020/0405020 A1   Dec. 31, 2020

(30) Foreign Application Priority Data

Jun. 27, 2019   (IN) .............................. 201941025661

(51) Int. Cl.
*A44C 27/00*   (2006.01)
*B21C 23/08*   (2006.01)
(Continued)

(52) U.S. Cl.
CPC .......... *A44C 27/002* (2013.01); *B21C 23/085* (2013.01); *B21D 53/44* (2013.01);
(Continued)

(58) Field of Classification Search
CPC . A44C 5/00; A44C 5/0084–0092; A44C 7/00; A44C 9/00–0015; A44C 13/00;
(Continued)

(56) References Cited

U.S. PATENT DOCUMENTS

| | | | | |
|---|---|---|---|---|
| 4,056,951 A | * | 11/1977 | Black | A44C 7/00 63/13 |
| 4,403,491 A | * | 9/1983 | Wassen | B21C 37/0818 228/17.5 |

(Continued)

FOREIGN PATENT DOCUMENTS

| | | | | |
|---|---|---|---|---|
| CN | 106984911 A | * | 7/2017 | ............. B23K 26/21 |
| JP | 10192965 A | * | 7/1998 | ............. B21C 37/15 |

*Primary Examiner* — Matthew P Travers
(74) *Attorney, Agent, or Firm* — Fish & Richardson P.C.

(57) ABSTRACT

A system for manufacturing hollow tubular jewellery comprises a die and core assembly for extruding a hollow metallic tube, wherein a core is positioned within a die of the die and core assembly to define three-dimensional surfaces or curved surfaces of a hollow metallic tube. A mandrel is provided for bending the hollow metallic tube, wherein the mandrel is fixed proximal from the die and core assembly. A laser source is provided, which is configured to emit a laser beam to form perforations on the hollow metallic tube. The system includes a fixture which is adapted to hold the hollow metallic tube. The fixture is configured to rotate and tilt to adjustably position a three-dimensional surface or curved surface of the hollow metallic tube perpendicular to the laser beam for forming perforations.

10 Claims, 10 Drawing Sheets

(51) Int. Cl.
*B23K 26/382* (2014.01)
*B21D 53/44* (2006.01)
*B21C 25/08* (2006.01)
*B21C 37/08* (2006.01)
*B21D 9/04* (2006.01)

(52) U.S. Cl.
CPC .......... *B23K 26/382* (2015.10); *B21C 25/08* (2013.01); *B21C 37/0818* (2013.01); *B21D 9/04* (2013.01)

(58) Field of Classification Search
CPC ...... A44C 15/00; A44C 15/0045–0095; A44C 27/00–003; Y10T 29/4959–49593; Y10T 29/49597; B21D 53/44; B21D 7/022; B21D 9/04; B21D 9/12; B21C 37/06; B21C 37/15; B21C 37/155; B21C 25/08; B21C 23/085; B21C 35/023; B21C 25/02; B21C 25/04; B21C 37/157; B21C 37/0818; B23K 26/382; B23K 37/0452; B23K 26/0823; B23B 47/281
See application file for complete search history.

(56) References Cited

U.S. PATENT DOCUMENTS

| | | | | |
|---|---|---|---|---|
| 6,144,007 | A * | 11/2000 | Levin | B23K 26/04 219/121.62 |
| 6,209,306 | B1 * | 4/2001 | Chia | A44C 11/00 59/35.1 |
| 2002/0023905 | A1 * | 2/2002 | Fukaya | B23K 26/1476 219/121.71 |
| 2002/0166847 | A1 * | 11/2002 | Lacchetti | B23K 26/0823 219/121.64 |
| 2002/0189283 | A1 * | 12/2002 | Chia | A44C 27/00 63/4 |
| 2003/0074881 | A1 * | 4/2003 | Chia | B21L 11/005 59/80 |
| 2006/0236674 | A1 * | 10/2006 | Cerato | A44C 27/00 59/82 |
| 2009/0056405 | A1 * | 3/2009 | Uan | B21C 1/24 72/368 |
| 2019/0387847 | A1 * | 12/2019 | Sen Gupta | B22D 25/026 |

* cited by examiner

SYSTEM AND METHOD FOR MANUFACTURING HOLLOW TUBULAR JEWELLERY

CLAIM OF PRIORITY

This application claims priority under 35 USC § 119 to Application Serial No. IN 201941025661, filed in the Intellectual Property India on Jun. 27, 2019, the entire contents of which are hereby incorporated by reference.

TECHNICAL FIELD

Present disclosure generally relates to a field of manufacturing. Particularly, but not exclusively, the present disclosure relates to manufacturing of jewelery. Further, embodiments of the disclosure disclose a system and a method for manufacturing a hollow tubular jewelery, which is of ultra-light weight.

BACKGROUND OF THE DISCLOSURE

Jewelery is a decorative item, that people desire to wear. Jewelery is available in a variety of designs, sizes and usage of precious stones in the jewelery, increases the overall value of the jewelery. Also, jewelery is a form of status quotient for people wearing them. Jewelery items such as necklaces, rings, collets, earrings, bangles etc., increases fashion quotient of people wearing them. Generally, jewelery may be manufactured of precious natural metals such as gold, silver, platinum and the like. In addition to these metals, precious stones such as diamonds, ruby, pearl, emerald and the like are also used in the jewelery to increase aesthetic appearance and value of the jewelery.

With increase in demand for decorative jewelery lot of efforts have been made to develop and manufacture a jewelery which pleases the customer. Like clothing, trends in jewelery will also change with time. This calls for quick adaptability of manufacturing the jewelery based on the current trend. One such trend is ultralight jewels which has gained quite a lot of popularity. The concept of manufacturing ultralight jewelery is known in the art. The ultralight jewelery is composed of tubular structure, which provides the advantage of weight reduction when compared to the solid structure. The tubular structure or the tube may be extruded from a strip of metal and the tube may be formed to a required shape to manufacture a jewelery such as ring, bangle, and the like.

Conventional process of manufacturing the tubular jewelery may include steps of metallic tube extrusion, winding of metallic tube to give it a round structure (e.g. bangle), and forming perforations to improve the appeal. This may be followed by studding and fusing different parts to obtain a required shape. The jewelery may then be subjected for a finishing operation to improve the smoothness or to remove abrasions. Such a manufacturing process is limited to manufacturing of conventional shapes such as circular, square, triangular and the like. However, with the everchanging trend, manufacturing the jewelery with such conventional shapes may not be enough, as the customer may not like to see the same sort of design every time.

The present disclosure is directed to overcome one or more limitations stated above or any other limitation associated with the conventional arts.

The information disclosed in this background of the disclosure section is only for enhancement of understanding of the general background of the invention and should not be taken as an acknowledgement or any form of suggestion that this information forms the prior art already known to a person skilled in the art.

SUMMARY OF THE DISCLOSURE

One or more shortcomings of conventional systems and process is overcome, and additional advantages are provided through the provision of the system and method for manufacturing ultra-light tubular jewelery as described in the present disclosure. Additional features and advantages are realized through the techniques of the present disclosure. Other embodiments and aspects of the disclosure are described in detail herein and are considered a part of the disclosure.

Embodiment of the present disclosure is directed to a system and method to manufacture unconventionally angled three-dimensional tubular jewelery, designed for promoting ultra-light weights.

In a limiting embodiment, a system for manufacturing a hollow tubular jewelery is disclosed. The system comprises of a die and core assembly for extruding a hollow metallic tube, wherein a core is positioned within a die of the die and core assembly to define at least one of three-dimensional surfaces and curved surfaces of the hollow metallic tube. A mandrel is provided for bending the hollow metallic tube, wherein the mandrel is fixed proximal from the die and core assembly. A laser source is configured to emit a laser beam is provided to form perforations on a bent hollow metallic tube. A fixture is provided, which is adapted to hold the bent hollow metallic tube. The fixture is configured to rotate and tilt to adjustably position the at least one three-dimensional surface and the curved surface of the bent hollow metallic tube perpendicular to the laser beam for forming the perforations. This helps in overcoming challenge of perforating unconventionally angled tubes at different angles.

In an embodiment, the core is positioned perpendicular to a top surface of the mandrel. A die holder is adjusted by at least one of an up-down motion and a front-back motion to adjust the core in a perpendicular position to top surface of the mandrel. The tip of the core is positioned to be in contact with a central region of the mandrel.

In an embodiment, the die is configured to define different geometrical shapes of the hollow metallic tube.

In another non-limiting embodiment, a method for manufacturing a hollow tubular jewelery is disclosed. The method comprises extruding a hollow metallic tube from a metallic strip through a die and core assembly. A core is positioned within a die of the die and core assembly to form at least one of three-dimensional surfaces and curved surfaces in the hollow metallic tube. The hollow metallic tube is then bent by means of a mandrel. The mandrel is fixed in proximity to the die and core assembly. The bent hollow metallic tube is positioned in a fixture, wherein the fixture is adapted to hold the bent hollow metallic tube. The fixture is configured to rotate and tilt to adjustably position the at least one three-dimensional surface and the curved surface of the bent hollow metallic tube perpendicular to a laser beam. Then, perforations are formed on the bent hollow metallic tube by emitting the laser beam by a laser source.

In an embodiment, the method comprises fusing a plurality of hollow metallic tubes to form a fusion product assembly. Fusing the plurality of hollow metallic tubes comprises fixing a plurality of ornaments onto the perforated hollow metallic tube. The plurality of hollow metallic tubes are then fused in one or more regions. Lastly, the one or more fused regions are given finishing by abrasive process.

It is to be understood that the aspects and embodiments of the disclosure described above may be used in any combination with each other. Several of the aspects and embodiments may be combined together to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF ACCOMPANYING DRAWINGS

The novel features and characteristic of the disclosure are set forth in the appended specification. The disclosure itself, however, as well as a preferred mode of use, further objectives and advantages thereof, will best be understood by reference to the following description of an illustrative embodiment when read in conjunction with the accompanying drawings. One or more embodiments are now described, by way of example only, with reference to the accompanying drawings wherein like reference numerals represent like elements and in which.

Figure 1:
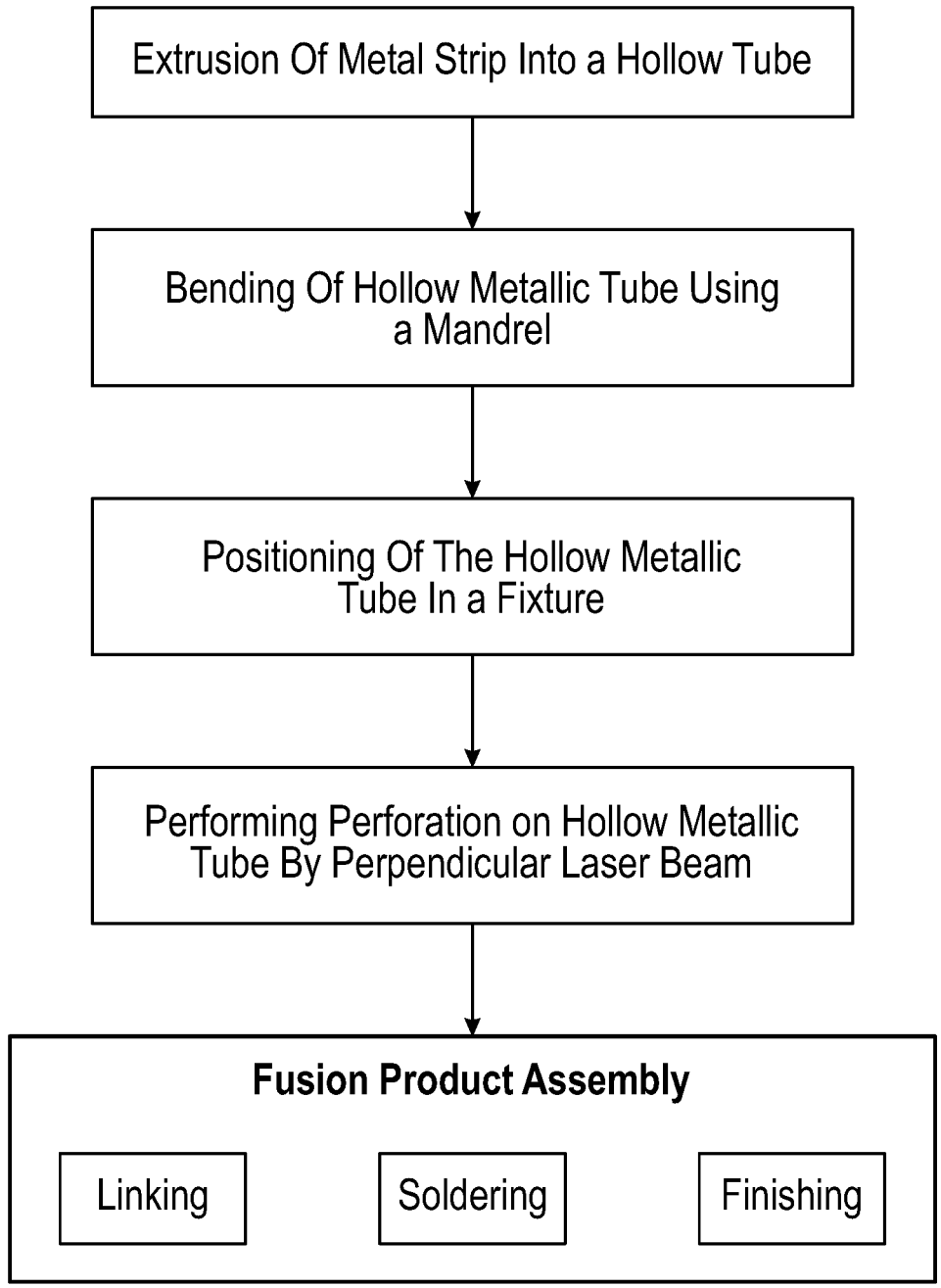
FIG. 1 is a flow chart of a method for manufacturing a hollow tubular jewelery in accordance with an embodiment of the present disclosure.

The figures depict embodiments of the disclosure for purposes of illustration only. One skilled in the art will readily recognize from the following description that alternative embodiments illustrated herein may be employed without departing from the principles of the disclosure described herein.

DESCRIPTION OF THE DISCLOSURE

While the embodiments in the disclosure are subject to various modifications and alternative forms, specific embodiment thereof has been shown by way of example in the figures and will be described below. It should be understood, however, that it is not intended to limit the disclosure to the particular forms disclosed, but on the contrary, the disclosure is to cover all modifications, equivalents, and alternative falling within the scope of the disclosure.

It is to be noted that a person skilled in the art would be motivated from the present disclosure that discloses a system and method for developing ultra-light tubular jewelery. However, such modifications should be construed within the scope of the disclosure. Accordingly, the drawings show only those specific details that are pertinent to understand the embodiments of the present disclosure, so as not to obscure the disclosure with details that will be readily apparent to those of ordinary skill in the art having the benefit of the description herein.

The terms "comprises", "comprising", or any other variations thereof used in the disclosure, are intended to cover a non-exclusive inclusion, such that a device, system, assembly that comprises a list of components does not include only those components but may include other components not expressly listed or inherent to such system, or assembly, or device. In other words, one or more elements in a system or device proceeded by "comprises . . . a" does not, without more constraints, preclude the existence of other elements or additional elements in the system or device.

The concept of manufacturing ultra-light weight tubular jewelries with perforations is known in the art. However, such manufacturing process or method is limited to basic cross section of the tubes such as round, square, oval, etc., leading to simple three dimensional tubes. However, with everchanging needs and trend, manufacturers or makers of jewels are coming out with ultralight jewels with unconventional cross-section like floral, star, lotus, etc. These unconventional cross-section may include angular surfaces and hence it may be difficult to perform further operations like forming perforations, etc.

The tubular jewelery with conventionally shaped cross sections can be easily perforated, without the any challenge. The present disclosure is directed to solve the problems associated with the conventional methods.

Accordingly, the present disclosure is directed to a system and method to manufacture unconventionally angled three-dimensional tubular jewelery, for promoting ultra-light weights. The system for manufacturing a hollow tubular jewelery includes a die and core assembly for extruding a hollow metallic tube, wherein a core is positioned within a die of the die and core assembly to define at least one of three-dimensional surfaces and curved surfaces of the hollow metallic tube. A mandrel is provided for bending the hollow metallic tube, wherein the mandrel is fixed proximal to the die and core assembly. The core is positioned perpendicular to top surface of the mandrel, and a tip of the core is positioned to be in contact with a central region of the mandrel. A laser source which is configured to emit a laser beam is provided to form perforations on a bent hollow metallic tube. The system also includes a fixture which is adapted to hold the bent hollow metallic tube. The fixture is configured to rotate and tilt to adjustably position the at least one three-dimensional surface and the curved surface of the bent hollow metallic tube perpendicular to the laser beam for forming the perforations.

Once the perforations are formed, the plurality of hollow metallic tubes may be subjected for fusing in a fusing station to form a fusion product assembly. Fusing the plurality of hollow metallic tubes comprises fixing a plurality of ornaments onto the perforated hollow metallic tube, and then fusing in one or more regions. Lastly, fused regions are given finishing by abrasive process. The system and method of the present disclosure thus helps in manufacturing the jewelery of unconventional shapes.

In the following detailed description of the embodiments of the disclosure, reference is made to the accompanying figures that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Referring to FIG. 1 which illustrates a flow diagram for the method [hereinafter referred to as method] for producing lightweight, unconventionally angled tubular jewelery. The first step as explained by the figure is extrusion of a metal strip (8) into a hollow metallic tube (9). To achieve this, tip of a metallic strip (8) is cut down into sharp edge, so that the metallic strip (8) can easily enter into the die (1b). The die (1b) then engages in the tube extrusion process. The metallic strip enters into die (1b) and is drawn until it gets locked into the mandrel (2). This initial portion of the metallic strip (8) may not be in the desired tubular form, and is still in a strip form. This metallic strip (8) first gets drawn out of the die and core assembly (1), and gets locked into the mandrel (2). The metallic strip (8) is then wound onto the mandrel (2). A core (1c) is then inserted into the die (1b), and moves deep into the die (1b) along with the metallic strip (8), until the core (1c) reaches a substantially middle portion of top surface of the mandrel (2a). The core (1c) helps in attaining the desired shape of the hollow metallic tube (9), which is then extruded from the die and core assembly (1), and wound on the mandrel (2) for bending [as depicted in the second step in FIG. 1]. This bent metallic tube (10) is then subjected to further operation of forming perforations to improve its aesthetic appearance. In an embodiment, the outer shape of the core is selected based on the profile or cross section of the tube to manufactured. As an example, for a floral profile of the tube, a core with floral cross section is selected.

Figure 5A:
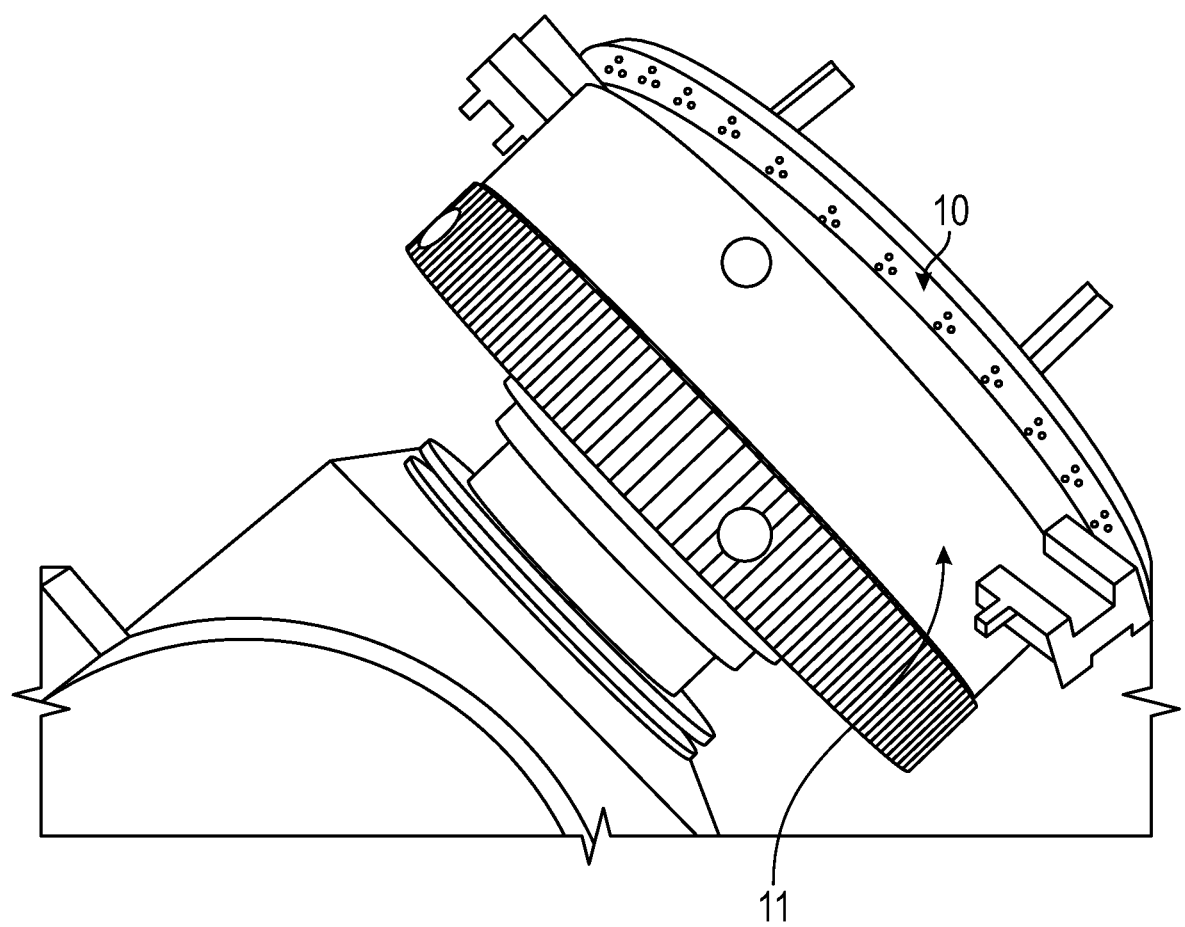
FIGS. 5a and 5b illustrates fixture and a laser source employed in the system of FIG. 2, in accordance with an embodiment of the present disclosure.
Figure 5B:
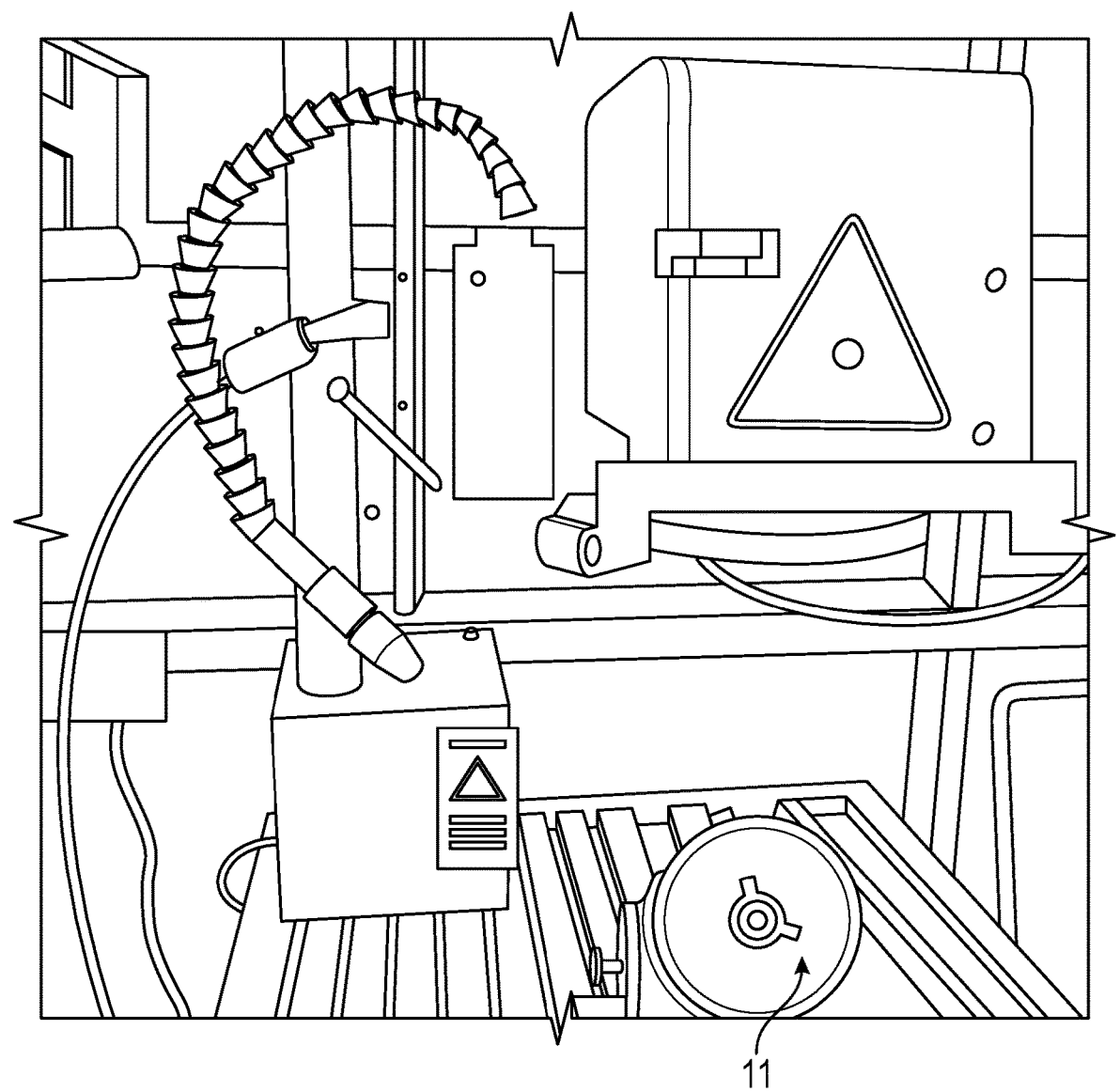
Figure 9:
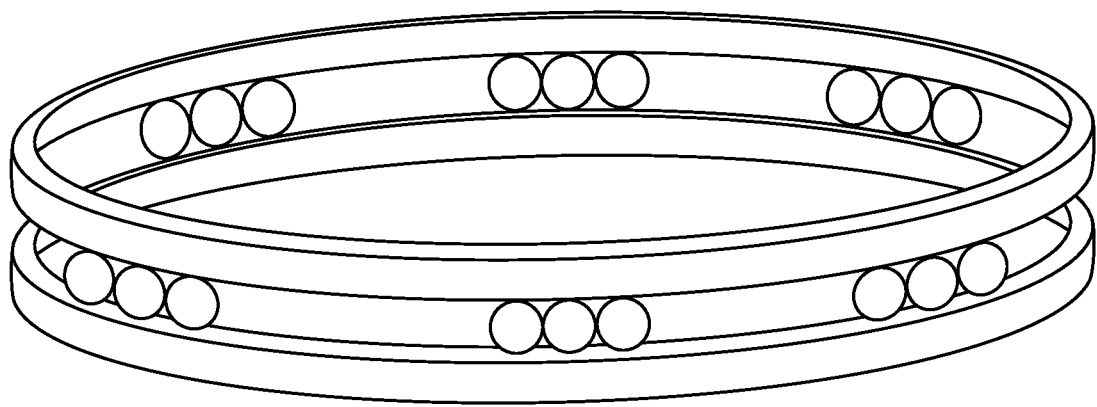

In an embodiment, the perforation may be formed by laser cutting process. The laser cutting may be performed using a laser source and a fixture as shown in FIGS. 5a and 5b. The laser source may be configured to pass a laser beam (5) onto the surface of the bent metallic tube (10). As depicted apparent from FIG. 5a, a fixture (11) is provided for positioning the bent metallic tube (10). The fixture (11) can simultaneously rotate and tilt so as to position the desired surface of the unconventionally angled bent metallic tube (10), which is to be perforated, perpendicular to the laser beam (5). In an embodiment, the fixture may include a ball joint and an actuator and the fixture may be controlled by a control unit associated with the system for positioning the surface of the hollow-metallic tube perpendicular to the beam of the laser source. These perforated tubular jewelery [as shown in FIG. 9] are then subjected to product fusion assembly, which comprises steps of linking, soldering and finishing [last step as in FIG. 1].

The process of linking comprises linking add on cast elements like studs, stones and the like to the tubular jewelery to improve the aesthetic appearance. The process of soldering comprises soldering the linked areas together by laser welding or manual soldering process. Then the process of finishing is carried out, and the process comprises finishing the soldered area with abrasive wheels and sheets to make the surface of the jewelery fine.

In an embodiment, after the process of winding, the thickness of the bent metallic tube (10) may be measured. If the thickness of bent metallic tube (10) does not match a predetermined thickness, the same is adjusted by adjusting the die clamp (la) in up-down direction to achieve the desired final thickness.

Figure 2:
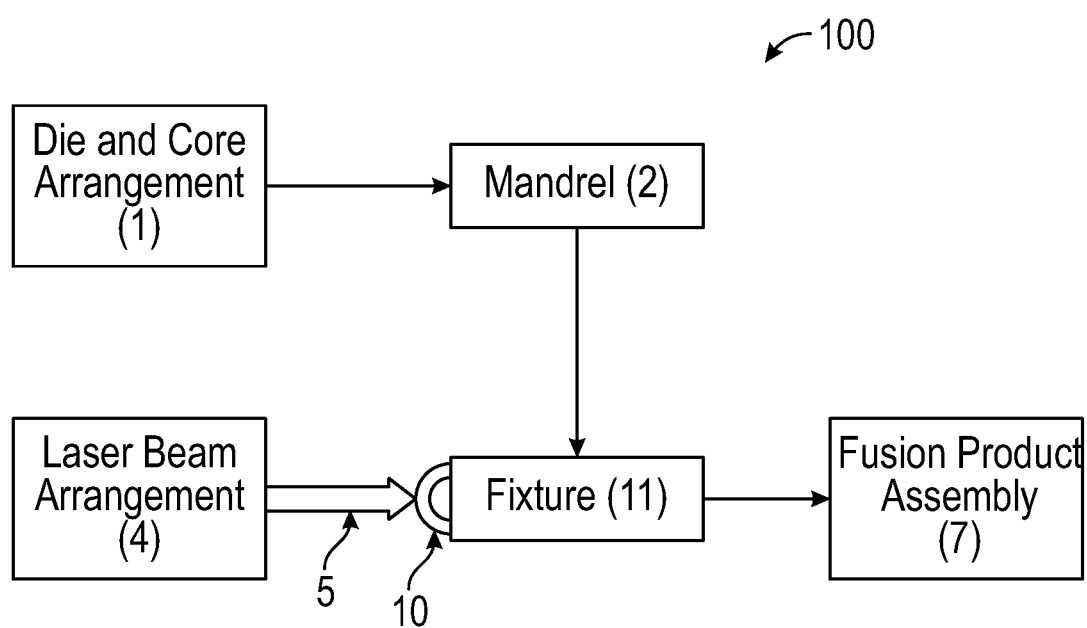
FIG. 2 illustrates a block diagram of a system for manufacturing a hollow tubular jewelery, in accordance with an embodiment of the present disclosure.
Figure 4:
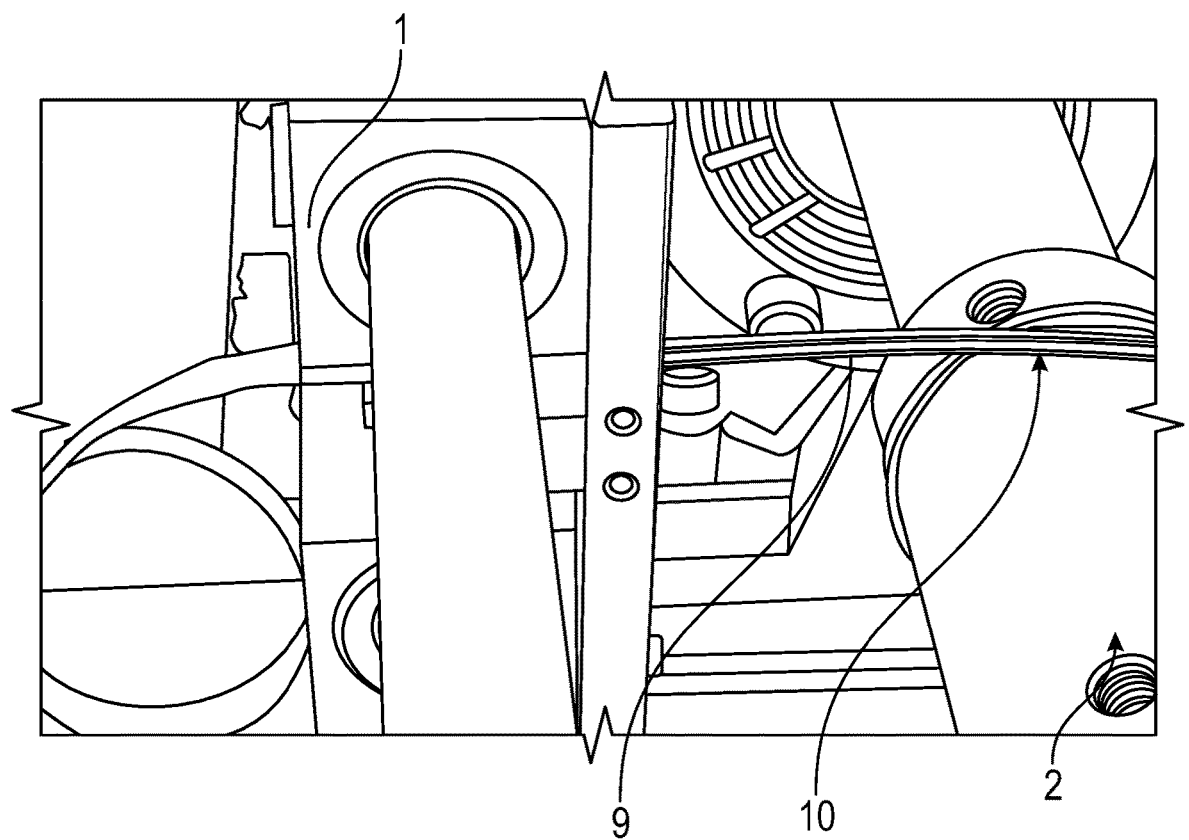
FIG. 4 illustrates a schematic view of a mandrel of the system of FIG. 2, in accordance with an embodiment of the present disclosure.

FIG. 2 in one exemplary embodiment of the present disclosure discloses a block diagram of system (100) for manufacturing a hollow tubular jewelery. The system (100) comprises a die and core assembly (1) for extruding a hollow metallic tube (9), wherein a core (1c) is positioned within a die (1b) of the die and core assembly (1) to define at least one of three-dimensional surfaces and curved surfaces of the hollow metallic tube (9). A mandrel (2) is provided for bending the hollow metallic tube (9), wherein the mandrel (2) is fixed proximal from the die and core assembly (1) [as shown in FIG. 4]. The core (1c) is positioned perpendicular to top surface of the mandrel (2). In an embodiment, a die holder (la) is adjusted by at least one of an up-down motion and a front-back motion to adjust the core (1c) in a perpendicular position to top surface of the mandrel (2). The tip of the core (1c) is positioned to be in contact with a central region of the mandrel (2) [as shown in FIG. 4]. The die (1b) is configured to define different geometrical shapes of the hollow metallic tube (9). A laser source (4) is provided, which is configured to emit a laser beam (5) to form perforations on a bent hollow metallic tube (10). Further, the system (100) includes a fixture (11) [as shown in FIG. 5a] which is adapted to hold the bent hollow metallic tube (10). The fixture (11) is configured to rotate and tilt to adjustably position the at least one three-dimensional surface and the curved surface of the bent hollow metallic tube (10) perpendicular to the laser beam (5) for forming the perforations.

Figure 3:
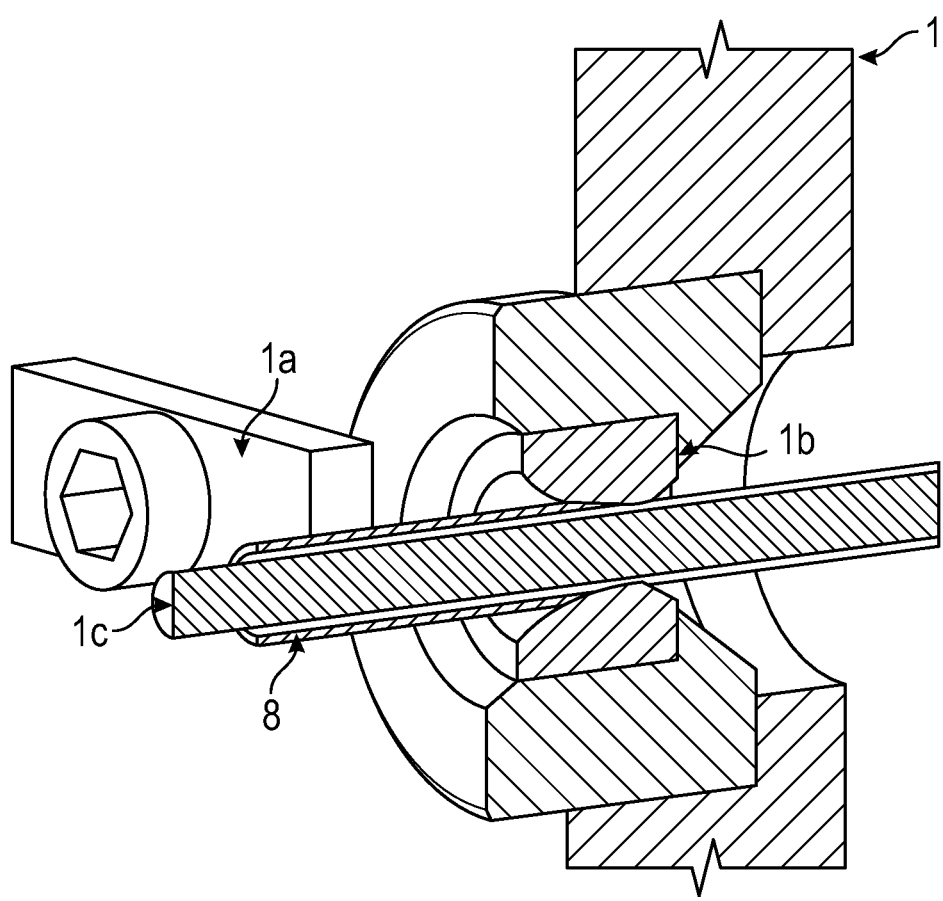
FIG. 3 illustrates a schematic sectional view of a die and core assembly of the system of FIG. 2, in accordance with an embodiment of the present disclosure.

FIG. 3 in one exemplary embodiment of the present disclosure discloses a die and core assembly (1). The die (1b) is clamped in position by the die holder (la). The die (1b) is of a predetermined cross-section, wherein, the core (1c) is inserted, after the mandrel (2) is placed proximal to the die and core assembly (1) [as shown in FIG. 4]. The metallic strip (8) which is inserted into the die and core assembly (1) is extruded into a metallic tube (9), and the core (1c) helps in achieving the final thickness of the metallic tube (9). This is done by adjusting the position of die (1b) by die holder (la).

FIGS. 5a and 5b in one exemplary embodiment of the present disclosure discloses fixture (11) and a laser source (4) employed in the system of FIG. 2 which is used for holding a bent metallic tube (10) for perforation by laser beam (5). The fixture (11) rotates and tilts based on the size and configuration of the jewelery to be adjusted therein, for proper positioning of the jewelery to be perforated. The simultaneous rotation and tilting of the fixture (11) help in positioning the surface to be perforated perpendicular to the laser beam (5).

Figure 6:
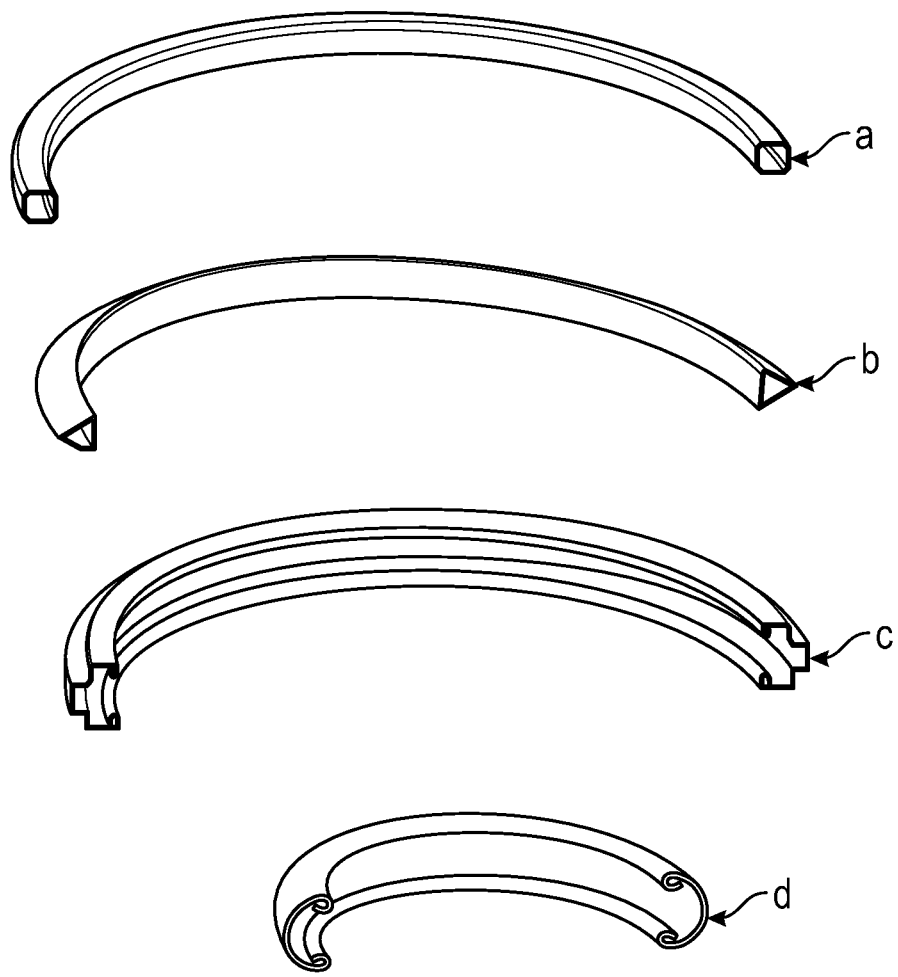
FIGS. 6 and 7 illustrate a sectional view of different profiles of the bent metallic tubes after they are extruded and wound on the mandrel, in accordance with an exemplary embodiment of the present disclosure.
Figure 7:
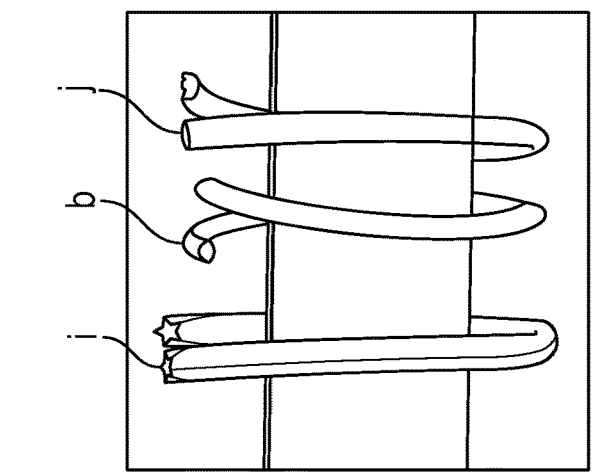
Figure 7:
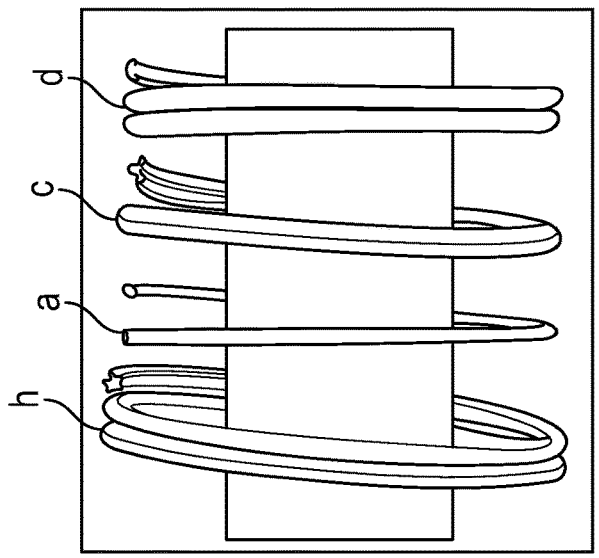
Figure 7:
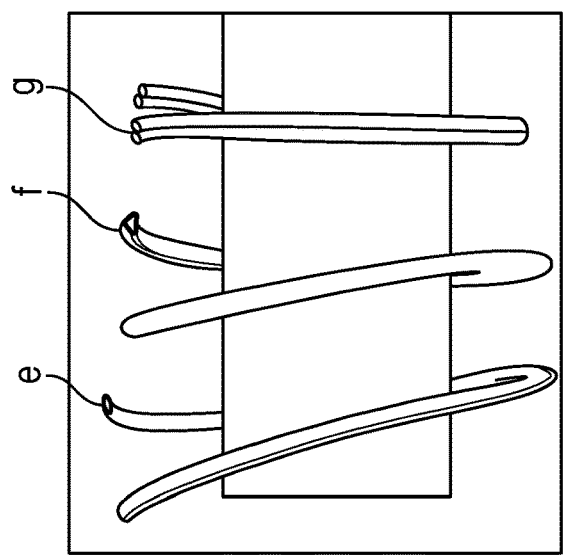

Now referring to FIGS. 6 and 7 which are exemplary embodiments of the present disclosure showing a sectional view of different profiles of the bent metallic tubes (10) after they are extruded and wound on the mandrel (2). These depict different kinds of profiles, but are not limited to square (a), triangular (b), step (c), C-profile (d), oval (e), arch (f), dual (g), pentagon (h), star (i), lotus (j). These bent metallic tubes, as can be understood from the figures are unconventionally shaped, and are therefore fixed onto specifically designed fixtures, which may rotate and tilt to make the surface of the bent metallic tube, which is to be perforated, to be perpendicular to the laser beam.

Figure 8:
FIGS. 8 and 9 illustrate schematic view of the end products which are obtained by a method and the system, in accordance with an exemplary embodiment of the present disclosure.

Now referring to FIGS. 8 and 9 which are exemplary embodiments of the present disclosure illustrating exemplary end products which are obtained after fusion product assembly. Once the perforations are formed, the plurality of hollow metallic tubes may be subjected for fusing in a fusing station to form a fusion product assembly. Fusing the plurality of hollow metallic tubes comprises fixing a plurality of ornaments onto the perforated hollow metallic tube, and then fusing in one or more regions. Lastly, fused regions are given finishing by abrasive process.

In an embodiment, the present disclosure discloses a system (100) and method for manufacturing light weighted tubular jewelery, thereby providing the advantage of weight reduction when compared to a solid structure. The tubular structure or the tube may be extruded from a strip of metal and the tube may be formed to a required shape to manufacture a jewelery such as ring, bangle, and the like.

In an embodiment, the present disclosure discloses a system (100) and method for manufacturing unconventionally angled three-dimensional tubular jewelery. This helps in obtaining jewelery with new designs, different from the conventional shapes, and thereby pleasing the customers due to their enhancement in terms of structural design.

In an embodiment, the present disclosure discloses a system (100) and method for laser perforation of the unconventionally angled tubular jewelery at different angled surfaces. The fixtures disclosed herein, is adapted to position the tubular jewelery perpendicular to the laser beam for perforation, by tilting and rotating. This helps in performing uniform and accurate perforations at different surfaces of the unconventionally angled tubular jewelery.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| REFERRAL NUMERALS | DESCRIPTION |
| --- | --- |
| 100 | System for manufacturing a hollow tubular jewellery |
| 1 | Die and core assembly |
| 1a | Die clamp |
| 1b | Die |
| 1c | Core |
| 2 | Mandrel |
| 2a | Top surface of the mandrel |
| 3 | Fixture |
| 4 | Laser beam arrangement |
| 5 | Perpendicular laser beam |
| 7 | Fusion product assembly |
| 8 | Metallic strip |
| 9 | Extruded metallic tube |
| 10 | Bent metallic tube |
| 11 | Fixture |

We claim:

1. A system for manufacturing a hollow tubular jewellery, the system comprising:
   a die and core assembly for extruding a hollow metallic tube, wherein a core is positioned within a die of the die and core assembly to define at least one of three-dimensional surfaces and curved surfaces of the hollow metallic tube;
   a mandrel for bending the hollow metallic tube, wherein the mandrel is fixed proximal from the die and core assembly, wherein a tip of the core is positioned to be in contact with a central region of the mandrel;
   a laser source configured to emit a laser beam to form perforations on a bent hollow metallic tube; and
   a fixture adapted to hold the bent hollow metallic tube, the fixture is configured to rotate and tilt to adjustably position the at least one three-dimensional surface and the curved surface of the bent hollow metallic tube perpendicular to the laser beam for forming the perforations.

2. The system as claimed in claim 1, wherein the core is positioned perpendicular to a top surface of the mandrel.

3. The system as claimed in claim 1, wherein a die holder is adjusted by at least one of an up-down motion and a front-back motion to adjust the core in a perpendicular position to a top surface of the mandrel.

4. The system as claimed in claim 1, wherein the die is configured to define different geometrical shapes of the hollow metallic tube.

5. A method for manufacturing a hollow tubular jewellery, the method comprising:
   extruding a hollow metallic tube from a metallic strip through a die and core assembly, wherein a core is positioned within a die of the die and core assembly to form at least one of three-dimensional surfaces and curved surfaces in the hollow metallic tube;
   bending the hollow metallic tube by means of a mandrel, wherein the mandrel is fixed proximal to the die and core assembly, wherein a tip of the core is positioned to be in contact with a central region of the mandrel;
   positioning of a bent hollow metallic tube in a fixture, wherein the fixture is adapted to hold the bent hollow metallic tube, and is configured to rotate and tilt to adjustably position the at least one three-dimensional surface and the curved surface of the bent hollow metallic tube perpendicular to a laser beam; and
   forming perforations on the bent hollow metallic tube by emitting the laser beam by a laser source.

6. The method as claimed in claim 5, wherein the core is positioned perpendicular to a top surface of the mandrel.

7. The method as claimed in claim 5, wherein a die holder is adjusted by at least one of an up-down motion and a front-back motion to adjust the core in a perpendicular position to a top surface of the mandrel.

8. The method as claimed in claim 5, wherein a hollow metallic tube of desired cross section is extruded from the die and core assembly and is subjected to bending by means of the mandrel, upon coming in contact with the mandrel.

9. The method as claimed in claim 5, comprising fusing a plurality of hollow metallic tubes to form a fusion product assembly.

10. The method as claimed in claim 9, wherein fusing the plurality of hollow metallic tubes comprises:
   fixing a plurality of ornaments onto at least one of the perforated hollow metallic tubes;
   fusing the plurality of hollow metallic tubes in one or more regions; and
   finishing of the one or more regions by an abrasive process.

* * * * *